(12) United States Patent
Keller et al.

(10) Patent No.: US 9,497,686 B2
(45) Date of Patent: Nov. 15, 2016

(54) PROVIDING OUT-OF-BAND MANAGEMENT TRAFFIC AND DATA TRAFFIC OVER A BACKUP PATH VIA A DUAL USE DEVICE

(71) Applicant: Verizon Patent and Licensing Inc., Arlington, VA (US)

(72) Inventors: Ellison F. Keller, Silver Spring, MD (US); Joseph E. Sheets, Frederick, MD (US); James E. Butler, Liberty Township, OH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 211 days.

(21) Appl. No.: 14/336,577

(22) Filed: Jul. 21, 2014

(65) Prior Publication Data

US 2016/0021600 A1   Jan. 21, 2016

(51) Int. Cl.
| H04W 4/00 | (2009.01) |
| H04W 40/28 | (2009.01) |
| H04W 76/02 | (2009.01) |
| H04W 88/06 | (2009.01) |
| H04L 12/725 | (2013.01) |

(52) U.S. Cl.
CPC ........... *H04W 40/28* (2013.01); *H04W 76/022* (2013.01); *H04L 45/306* (2013.01); *H04W 88/06* (2013.01)

(58) Field of Classification Search
None
See application file for complete search history.

(56) References Cited

U.S. PATENT DOCUMENTS

| 8,064,391 | B2 * | 11/2011 | Kozisek | ............. H04L 41/0823 370/219 |
| 8,544,080 | B2 * | 9/2013 | Arauz Rosado | .... H04L 12/4641 370/230 |
| 2009/0041038 | A1 * | 2/2009 | Martini | ................... H04L 45/50 370/401 |
| 2010/0281251 | A1 * | 11/2010 | Arauz Rosado | .... H04L 12/4641 713/152 |
| 2011/0292807 | A1 * | 12/2011 | Shah | ..................... H04W 24/02 370/237 |
| 2014/0328166 | A1 * | 11/2014 | Wen | ........................ H04L 45/22 370/228 |
| 2015/0326471 | A1 * | 11/2015 | Anandan | ................ H04L 45/22 370/228 |
| 2016/0014159 | A1 * | 1/2016 | Schrecker | ............ H04L 63/029 726/1 |

OTHER PUBLICATIONS

CradlePoint Technology, "CradlePoint Serial Console", http://www.cradlepoint.com/sites/default/files/productdocs/USB_to_Serial_Console-10.16.12.pdf, 2012, 1 page.
CradlePoint, "Series 3: Configuring Serial Redirect on Cradlepoint Router", http://knowledgebase.cradlepoint.com/articles/Support/Configuring-Serial-Redirect-on-Cradlepoint-Series-3-Routers, Jan. 16, 2014, 3 pages.

(Continued)

*Primary Examiner* — Phirin Sam

(57) ABSTRACT

A device may receive incoming network traffic associated with a network device. The device may determine whether the incoming network traffic is management traffic or data traffic. The management traffic may be traffic for performing out-of-band management of the network device, and the data traffic may be traffic other than traffic for performing out-of-band management of the network device. The device may provide, to the network device, the incoming network traffic via a first connection or a second connection based on determining whether the incoming network traffic is management traffic or data traffic. The device may provide the incoming network traffic to the network device via the first connection when the incoming network traffic is management traffic, and may provide the incoming network traffic to the network device via the second connection when the incoming network traffic is data traffic.

20 Claims, 13 Drawing Sheets

(56) References Cited

OTHER PUBLICATIONS

CradlePoint, "Series 3: How to Configure IP Pass-Through on a capable CradlePoint router", http://knowledgebase.cradlepoint.com/articles/Support/Configure-IP-Pass-Through-on-a-Series-3-CradlePoint, Jan. 16, 2014, 3 pages.

CradlePoint, "Series 2: IP Pass-Through Best Practices", http://knowledgebase.cradlepoint.com/articles/Support/Series-3-IP-Pass-Through-Best-Practices, Jan. 16, 2014, 2 pages.

\* cited by examiner

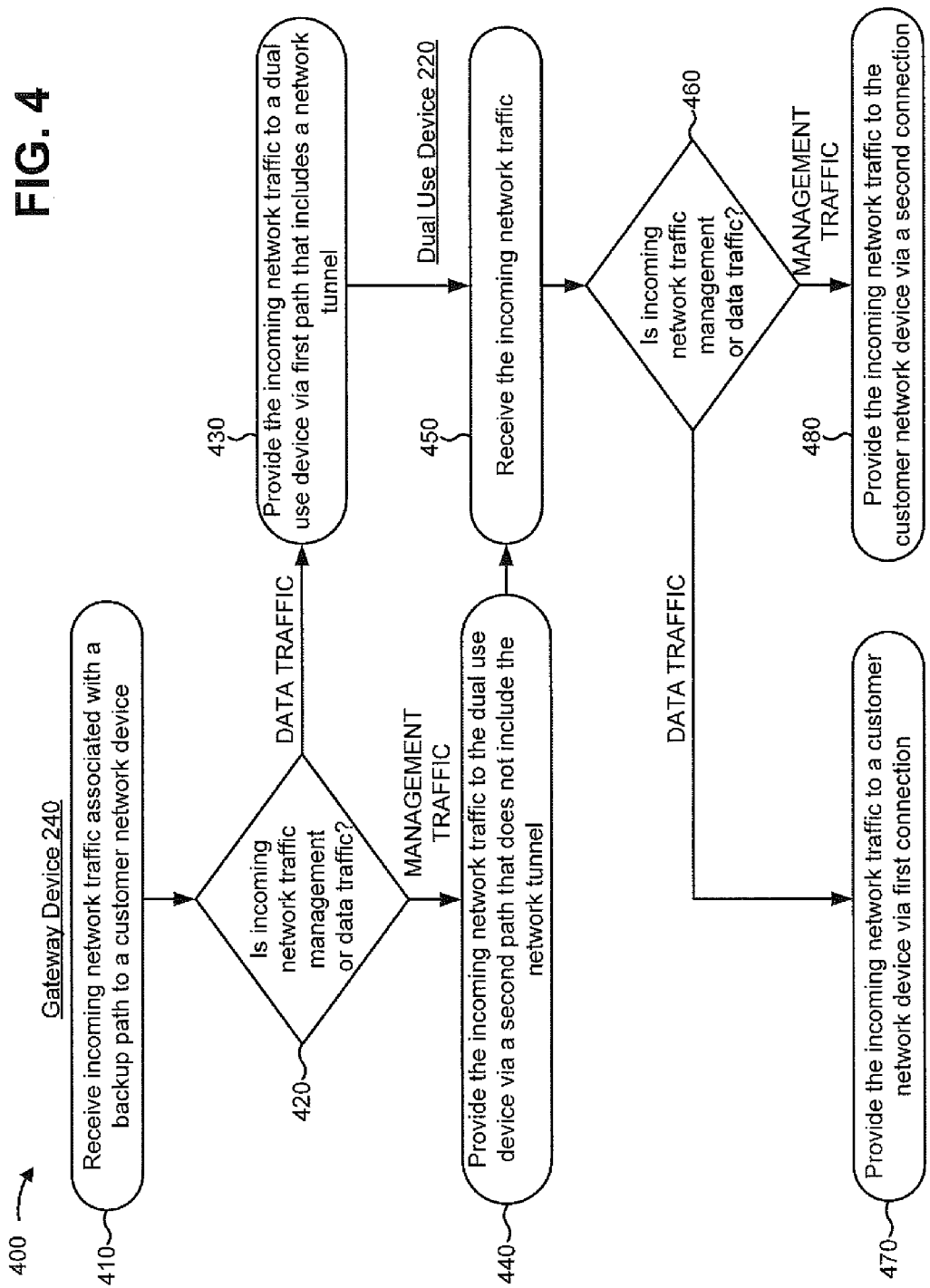

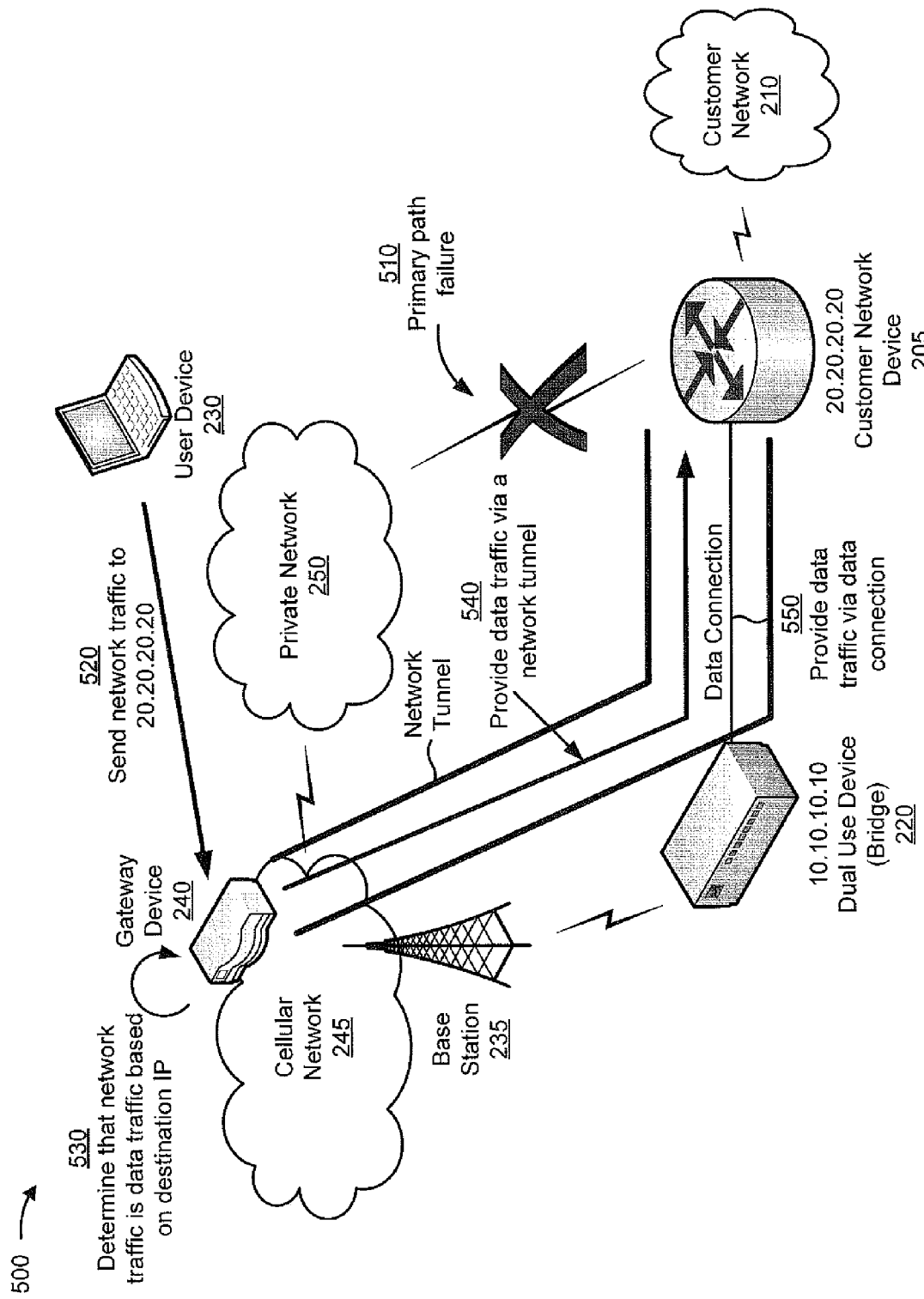

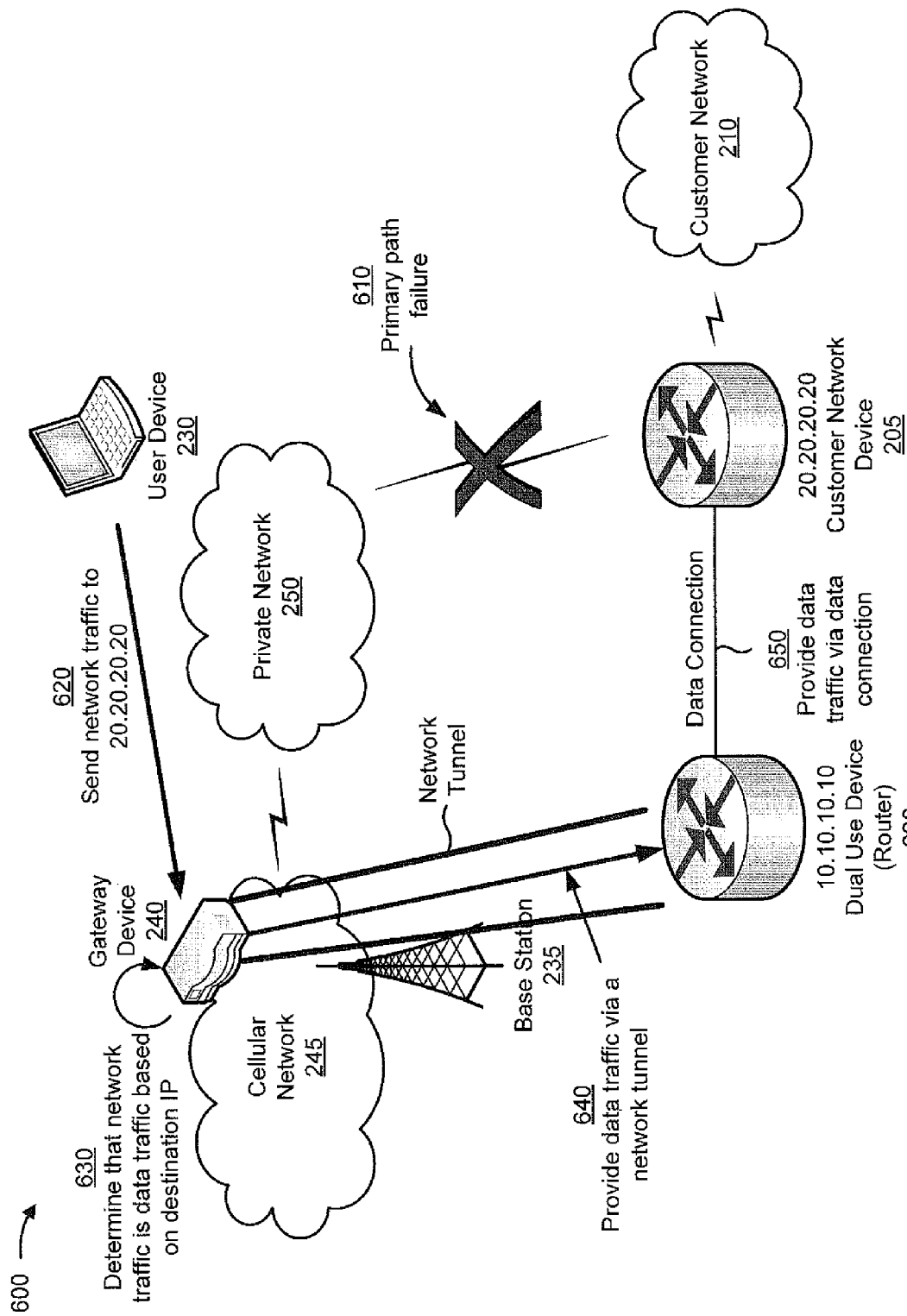

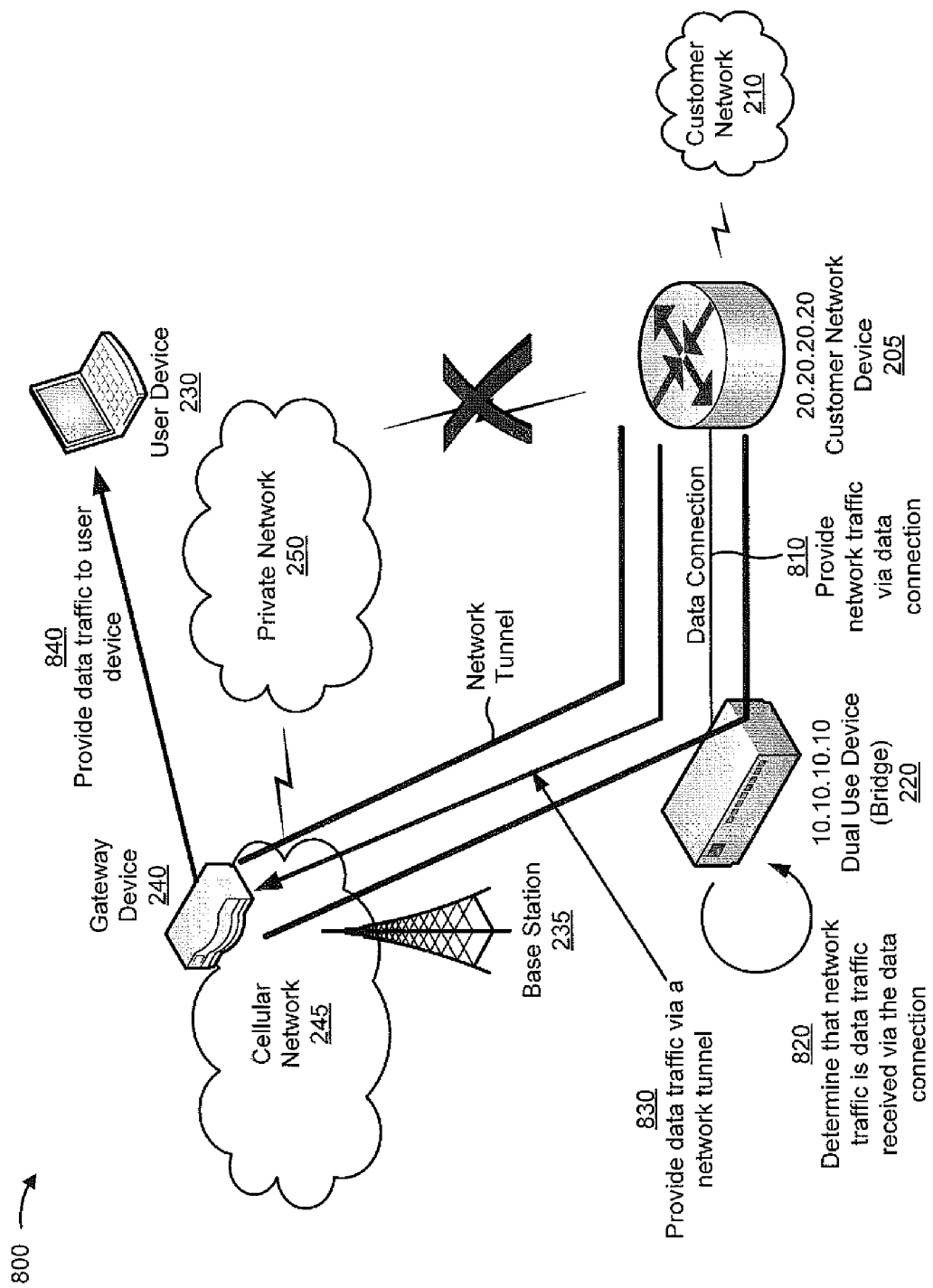

PROVIDING OUT-OF-BAND MANAGEMENT TRAFFIC AND DATA TRAFFIC OVER A BACKUP PATH VIA A DUAL USE DEVICE

BACKGROUND

In computer administration, out-of-band management may refer to management of a device via a system console of the device. Out-of-band management may be provided even in the event of a device failure so that an administrator may troubleshoot and/or fix the device.

BRIEF DESCRIPTION OF THE DRAWINGS

FIG. 4 is a flow chart of an example process for managing incoming out-of-band management traffic and data traffic over a backup path via a dual use device;

FIGS. 5A and 5B are diagrams of an example implementation relating to the example process shown in FIG. 4;

FIGS. 6A and 6B are diagrams of another example implementation relating to the example process shown in FIG. 4;

FIGS. 8A and 8B are diagrams of an example implementation relating to the example process shown in FIG. 7.

DETAILED DESCRIPTION OF PREFERRED EMBODIMENTS

The following detailed description of example implementations refers to the accompanying drawings. The same reference numbers in different drawings may identify the same or similar elements.

A customer of a network service provider may want to establish a backup communication path (e.g., between an internal customer network and external devices) in case a primary communication path fails. The customer may want the backup communication path to be capable of transferring data traffic between internal customer devices (e.g., located at a customer premises) and external devices (e.g., employee devices, third party devices, etc.). Furthermore, the customer may want the backup communication path to be capable of transferring management traffic for out-of-band management of a customer network device (e.g., to configure the customer network device, to troubleshoot the customer network device, to repair the customer network device, to monitor the customer network device, etc.). In some cases, the data traffic and the management traffic may be processed using different devices or different networks, which may be costly. Implementations described herein assist in combining the processing of data traffic and management traffic using a device and/or network capable of differentiating between the different types of traffic.

Figure 1:
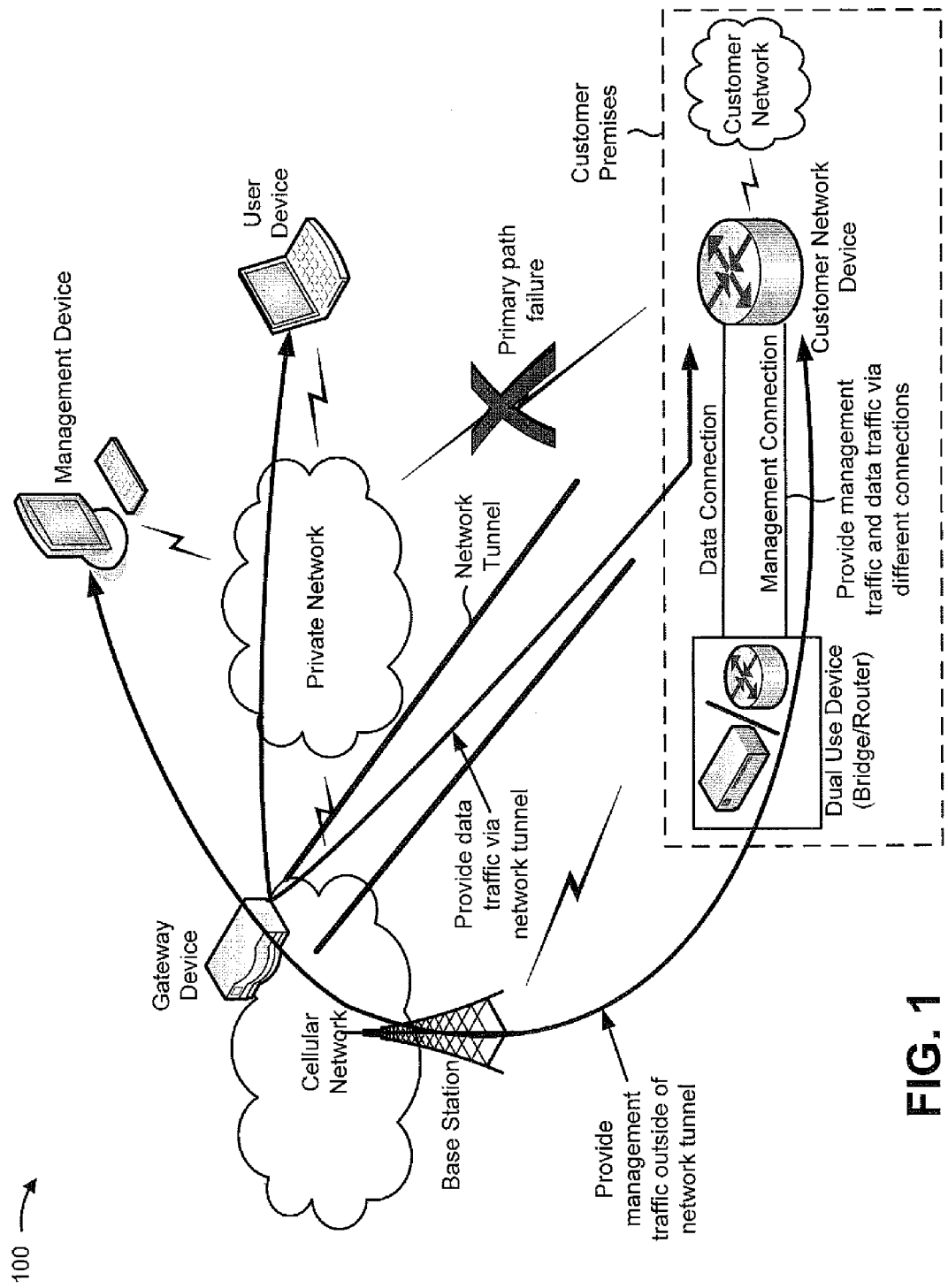
FIG. 1 is a diagram of an overview of an example implementation described herein.

FIG. 1 is a diagram of an overview of an example implementation 100 described herein. As shown in FIG. 1, a customer network device, a customer network, and a dual use device may be located at a customer premises. For example, the customer network device may include a router that routes traffic to and/or from a customer device (e.g., a server device) via the customer network. The customer network device may send and/or receive data traffic via a private network. For example, the customer network device may route data traffic between a user device and the customer network via the private network. Furthermore, a management device may be used to manage the customer network device by sending out-of-band management traffic to the customer network device via the private network, which may include a wired network or a wireless network.

As further shown in FIG. 1, assume that there is a failure in the primary path between the customer network device and the private network. In this case, the customer network device may utilize the dual use device (e.g., a bridge, a router, etc.) and a gateway device, associated with the cellular network, to send network traffic over a backup cellular path, such as by using a base station to send the network traffic over a cellular network. As shown, the dual use device and the gateway device may utilize a network tunnel to provide data traffic between the user device and the dual use device, and the dual use device may provide the data traffic to the customer network device via a data connection (e.g., an Ethernet connection). As further shown, the dual use device and the gateway device may provide management traffic, associated with the management device, outside of the network tunnel, and the dual use device may provide the management traffic to the customer network device via a management connection (e.g., a serial connection). In this way, the dual use device and the gateway device may assist in providing out-of-band management and a cellular backup path for communications associated with the customer network device.

Figure 2:
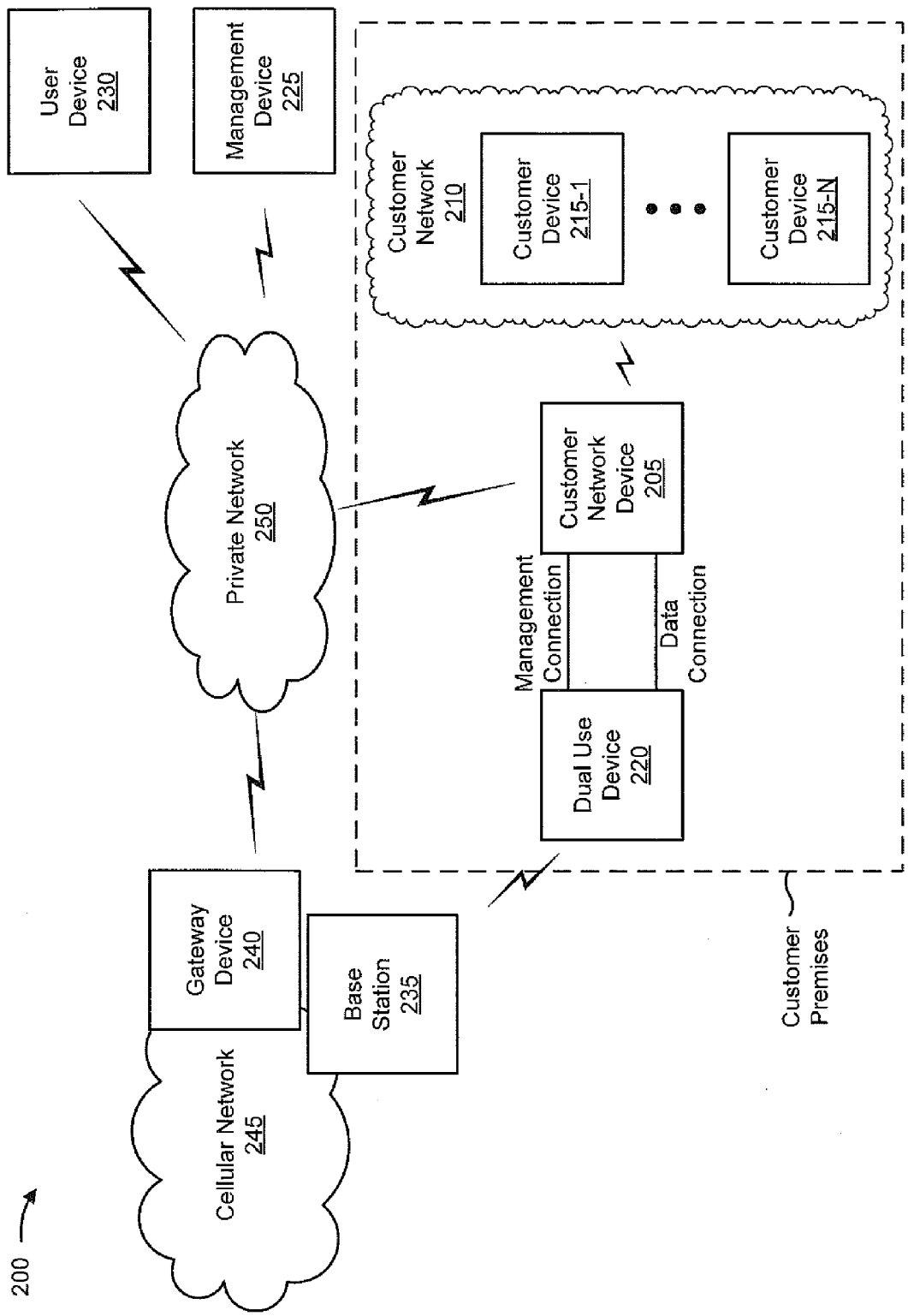
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer network device 205, a customer network 210, a set of customer devices 215-1 through 215-N(N≥1) (hereinafter referred to collectively as "customer devices 215," and individually as "customer device 215"), a dual use device 220, a management device 225, a user device 230, a base station 235, a gateway device 240, a cellular network 245, and/or a private network 250. Devices of environment 200 may interconnect via wired connections, wireless connections, or a combination of wired and wireless connections.

Customer network device 205 may include one or more devices capable of receiving, generating, processing, storing, and/or providing network traffic. For example, customer network device 205 may include a router, a switch, a hub, a firewall, a gateway, a bridge, a load balancer, an intrusion detection system, a security device, a server device (e.g., a proxy server, a reverse proxy, etc.), or a similar device. In some implementations, customer network device 205 may process data traffic destined for and/or received from customer device 215, and/or may process management traffic that permits management device 225 to perform out-of-band management associated with customer network device 205 and/or customer network 210. Customer network device 205 may include a data port (e.g., an Ethernet port, etc.) that provides a data connection (e.g., an Ethernet connection, etc.) to dual use device 220, and via which data traffic is transferred between customer network device 205 and dual use device 220. Furthermore, customer network device 205 may include a management port (e.g., a serial port, a console port, a universal serial bus (USB) port, an auxiliary port, etc.) that provides a management connection (e.g., a serial connection, etc.) to dual use device 220, and via which management traffic is transferred between customer network device 205 and dual use device 220.

Customer network device 205 may be used in connection with a single customer device 215 or a group of customer devices 215 (e.g., within customer network 210, such as a data center, a private network, etc.). Communications may be routed through customer network device 205 to reach customer network 210. For example, customer network device 205 may be positioned within a network as a gateway that provides access to customer network 210.

Customer network 210 may include one or more wired and/or wireless networks. For example, customer network 210 may include a local area network (LAN), a private network, an ad hoc network, an intranet, a cloud computing network, and/or a combination of these or another type of network. In some implementations, customer network 210 may be a private network associated with a customer of a service provider that provides network services (e.g., cellular network services, private network services, virtual private network services, etc.). Additionally, or alternatively, customer network 210 may be located at a customer premises.

Customer device 215 may include one or more devices capable of receiving, generating, processing, storing, and/or providing information associated with a customer, such as a business entity. For example, customer device 215 may include a computing device and/or a communication device, such as a server device (e.g., a web server, a back-end server, a host server, a storage server, etc.), a desktop computer, a laptop computer, a point-of-sale device, or a similar device. In some implementations, customer device 215 may store information associated with the customer (e.g., sales records, customer orders, etc.). Additionally, or alternatively, customer device 215 may receive information from and/or transmit information to another device (e.g., user device 230) via network device 210.

Dual use device 220 may include one or more devices capable of receiving, generating, processing, storing, and/or providing network traffic. For example, dual use device 220 may include a bridge (e.g., a cellular bridge), a router (e.g., a cellular router), a modem (e.g., a cellular modem), a switch, a hub, a gateway, or a similar device. Dual use device 220 may receive and/or provide network traffic (e.g., data traffic, management traffic, etc.) via an air interface with base station 235 (e.g., using a cellular modem). Dual use device 220 may receive and/or provide management traffic via a management connection with customer network device 205, such as a serial connection with a console port of customer network device 205. Additionally, or alternatively, dual use device 220 may receive and/or provide data traffic via a data connection with customer network device 205, such as an Ethernet connection with a data port of customer network device 205. In this way, dual use device 220 may provide out-of-band access to a console of customer network device 205, and may provide a backup path for customer network device 205 using the cellular connection (e.g., when a direct connection between customer network device 205 and private network 250 experiences a failure).

Management device 225 may include one or more devices capable of receiving, generating, processing, storing, and/or providing management traffic (e.g., used to manage and/or configure customer network device 205). For example, management device 225 may include a computing device and/or communication device, such as a client terminal, a desktop computer, a laptop computer, a server device, or a similar device. Management device 225 may send management traffic to customer network device 205, and may receive management traffic from customer network device 205. When a primary path between private network 250 and customer network device 205 fails, management device 225 may send and/or receive the management traffic via a backup path that traverses, for example, dual use device 220, base station 235, cellular network 245, gateway device 240, and private network 250.

User device 230 may include one or more devices capable of receiving, generating, processing, storing, and/or providing data traffic (e.g., network traffic sent from and/or destined for customer device 215, and/or network traffic that is not used to manage and/or configure customer network device 205). For example, user device 230 may include a computing device and/or communication device, such as a mobile device (e.g., a smart phone), a desktop computer, a laptop computer, a tablet computer, a server device, or a similar device. User device 230 may send data traffic to customer network device 205 for transfer to customer device 215, and may receive data traffic from customer device 215 via customer network device 205. When a primary path between private network 250 and customer network device 205 fails, user device 230 may send and/or receive the data traffic via a backup path that traverses, for example, dual use device 220, base station 235, cellular network 245, gateway device 240, and private network 250.

Base station 235 may include one or more devices capable of transferring network traffic, such as management traffic and/or data traffic (e.g., audio traffic, video traffic, text traffic, etc.), destined for and/or received from one or more devices shown in FIG. 2 (e.g., dual use device 220, gateway device 240, etc.). In some implementations, base station 235 may include an evolved Node B associated with a long term evolution (LTE) network that receives traffic from and/or sends traffic over cellular network 245 (e.g., to and/or from private network 250) via a packet data network gateway and/or a serving gateway. Additionally, or alternatively, base station 235 may be associated with a radio access network other than an LTE network. Base station 235 may send traffic to and/or receive traffic from dual use device 220 via an air interface.

Gateway device 240 may include one or more devices capable of transferring network traffic, such as management traffic and/or data traffic, destined for and/or received from one or more devices shown in FIG. 2 (e.g., base station 235, dual use device 220, customer network device 205, etc.). For example, gateway device 240 may include a gateway, a router, a switch, a hub, a firewall, a bridge, a load balancer, an intrusion detection system, a security device, a server device (e.g., a proxy server, a reverse proxy, etc.), or a similar device. In some implementations, gateway device 240 may include an edge router that provides network traffic processing and transfers network traffic between cellular network 245 and private network 250. Additionally, or alternatively, gateway device 240 may establish a network tunnel to dual use device 220 and/or customer network device 205 (e.g., via base station 235). In some implementations, gateway device 240 may transmit and/or receive data traffic via the network tunnel, and may transmit and/or receive management traffic outside of the network tunnel.

Cellular network 245 may include one or more wireless networks, such as one or more cellular networks. For example, cellular network 245 may include a cellular network (e.g., an LTE network, a 4G network, a 3G network, a 2G network, a code division multiple access (CDMA)

network, etc.), a public land mobile network (PLMN), a LAN, a wide area network (WAN), a metropolitan area network (MAN), and/or a combination of these or other types of networks (e.g., a combination of a cellular network and a non-cellular network).

Private network 250 may include one or more wired and/or wireless networks. In some implementations, private network 250 may include a network other than a cellular network (e.g., other than cellular network 245). For example, private network 250 may include a PLMN, a LAN, a WAN, a MAN, a telephone network (e.g., the Public Switched Telephone Network (PSTN)), an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
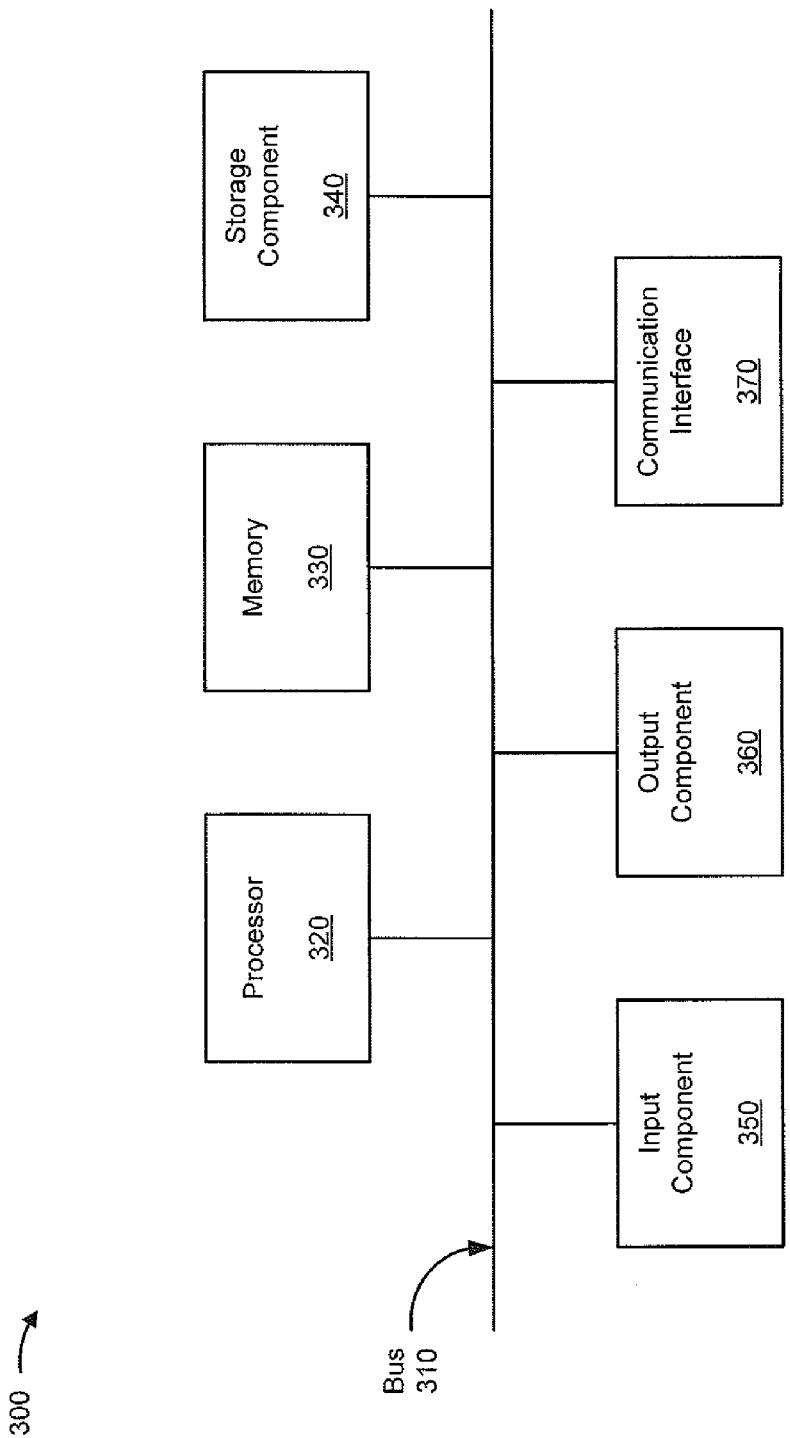
FIG. 3 is a diagram of example components of one or more devices of FIG. 2.

FIG. 3 is a diagram of example components of a device 300. Device 300 may correspond to customer network device 205, customer device 215, dual use device 220, management device 225, user device 230, base station 235, and/or gateway device 240. In some implementations, customer network device 205, customer device 215, dual use device 220, management device 225, user device 230, base station 235, and/or gateway device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing incoming out-of-band management traffic and data traffic over a backup path via a dual use device. In some implementations, one or more process blocks of FIG. 4 may be performed by gateway device 240 and/or dual use device 220. Additionally, or alternatively, one or more process blocks of FIG. 4 may be performed by another device or a group of devices separate from or including gateway device 240 and/or dual use device 220, such as customer network device 205, customer device 215, management device 225, user device 230, and/or base station 235.

As shown in FIG. 4, process 400 may include receiving incoming network traffic associated with a backup path to a customer network device (block 410). For example, gateway device 240 may receive incoming network traffic. The incoming network traffic may be received from, for example, management device 225 and/or user device 230 (e.g., via private network 250). Additionally, or alternatively, the incoming network traffic may be destined for customer network device 205, customer network 210, and/or customer device 215. In some implementations, gateway device 240 may receive the incoming network traffic due to a failure in a primary path between private network 250 and customer network device 205. The incoming network traffic may be traffic that is incoming to a customer premises, in some implementations.

As further shown in FIG. 4, process 400 may include determining whether the incoming network traffic is management traffic or data traffic (block 420). For example, gateway device 240 may analyze the incoming network traffic to determine whether the incoming network traffic is management traffic or data traffic. Management traffic may refer to network traffic associated with managing and/or configuring customer network device 205 and/or customer network 210. In some implementations, gateway device 240 may receive management traffic from and/or may provide management traffic to management device 225. Data traffic may refer to network traffic other than management traffic. In some implementations, gateway device 240 may receive data traffic from and/or may provide data to user device 230.

Gateway device 240 may determine whether incoming network traffic is management traffic or data traffic based on a destination network address (e.g., a destination internet protocol (IP) address, a destination media access control (MAC) address, etc.) associated with the incoming network traffic, in some implementations. For example, if incoming network traffic is destined for dual use device 220 (e.g., if a destination IP address, included in the network traffic, identifies dual use device 220), then gateway device 240 may determine that the network traffic is management traffic. Alternatively, if the incoming network traffic is not destined for dual use device 220 (e.g., is destined for customer network device 205, customer device 215, etc.), then gateway device 240 may determine that the network traffic is data traffic.

Additionally, or alternatively, gateway device 240 may determine whether incoming network traffic is management traffic or data traffic based on a source network address (e.g., a source IP address, a source MAC address, etc.) associated with the incoming network traffic. For example, if incoming network traffic is received from management device 225 (e.g., if a source IP address, included in the network traffic, identifies management device 225), then gateway device 240 may determine that the network traffic is management traffic. Alternatively, if the incoming network traffic is not received from management device 225 (e.g., is received from user device 230), then gateway device 240 may determine that the network traffic is data traffic.

In some implementations, gateway device 240 may store a data structure that identifies a network address and a device with which the network address is associated. For example, relationship information stored in the data structure may indicate a relationship between a particular network address and a particular device, such as customer network device 205, customer device 215, dual use device 220, management device 225, user device 230, etc. In this way, gateway device 240 may determine a type of device for which the network traffic is destined and/or from which the network traffic is received, and may determine whether the network traffic is management traffic or data traffic based on the type of device.

Additionally, or alternatively, gateway device 240 may determine whether incoming network traffic is management traffic or data traffic based on a traffic type identifier included in the network traffic (e.g., a network traffic packet). For example, the network traffic may include a traffic type identifier that identifies whether the network traffic is management traffic or data traffic. Gateway device 240 may analyze the traffic type identifier to determine whether incoming network traffic is management traffic or data traffic.

As further shown in FIG. 4, if the incoming network traffic is data traffic (block 420—DATA TRAFFIC), then process 400 may include providing the incoming network traffic to a dual use device via a first path that includes a network tunnel (block 430). For example, if gateway device 240 determines that the incoming network traffic is data traffic, then gateway device 240 may provide the data traffic to dual use device 220 via a network tunnel. Gateway device 240 may encapsulate the data traffic with a tunnel endpoint identifier (e.g., that identifies a tunnel endpoint device, such as customer network device 205 or dual use device 220), and may provide the encapsulated data traffic via the network tunnel (e.g., via base station 235). The network tunnel may include, for example a network mobility (NeMo) tunnel, a dynamic mobile network routing (DMNR) tunnel, or the like.

As further shown in FIG. 4, if the incoming network traffic is management traffic (block 420—MANAGEMENT TRAFFIC), then process 400 may include providing the incoming network traffic to a dual use device via a second path that does not include the network tunnel (block 440). For example, if gateway device 240 determines that the incoming network traffic is management traffic, then gateway device 240 may provide the management traffic to dual use device 220 via a path that does not include the network tunnel. In some implementations, gateway device 240 may provide management traffic to and/or may receive management traffic from dual use device 220 via a telnet session, a secure shell (SSH) session, or the like.

As further shown in FIG. 4, process 400 may include receiving the incoming network traffic (block 450), and determining whether the incoming network traffic is management traffic or data traffic (block 460). For example, dual use device 220 may receive the incoming network traffic, transmitted by gateway device 240, via base station 235.

Dual use device 220 may determine whether incoming network traffic is management traffic or data traffic based on a destination network address associated with the incoming network traffic, a source network address associated with the incoming traffic, and/or a traffic type identifier included in the incoming network traffic, as described above in connection with block 420. Additionally, or alternatively, dual use device 220 may determine whether incoming network traffic is management traffic or data traffic based on a path via which the network traffic is received. For example, if dual use device 220 determines that the network traffic was received via the network tunnel (e.g., a first path that includes the network tunnel), then dual use device 220 may determine that the network traffic is data traffic. As another example, if dual use device 220 determines that the network traffic was not received via the network tunnel (e.g., was received via a second path that does not include the network tunnel), then dual use device 220 may determine that the network traffic is management traffic.

In some implementations, such as when dual use device 220 is a bridge, the network tunnel may terminate at customer network device 205. In some implementations, such as when dual use device 220 is a router, the network tunnel may terminate at dual use device 220.

As further shown in FIG. 4, if the incoming network traffic is data traffic (block 460—DATA TRAFFIC), then process 400 may include providing the incoming network traffic to a customer network device via a first connection (block 470). For example, if dual use device 220 determines that the network traffic is data traffic, then dual use device 220 may provide (e.g., may forward) the data traffic to customer network device 205 via a data connection. The data connection may include, for example, an Ethernet connection.

In some implementations, the network tunnel may include the data connection between dual use device 220 and customer network device 205. In other words, when encapsulating data traffic to provide the data traffic over the network tunnel, gateway device 240 may identify customer network device 205 as a network tunnel endpoint. When dual use device 220 receives the data traffic via the tunnel, dual use device 220 may forward the data traffic, via the network tunnel and over the data connection, to customer network device 205. Customer network device 205 may decapsulate the data traffic, and may provide the data traffic to a destination device (e.g., a particular customer device 215).

As further shown in FIG. 4, if the incoming network traffic is management traffic (block 460—MANAGEMENT TRAFFIC), then process 400 may include providing the incoming network traffic to the customer network device via a second connection (block 480). For example, if dual use device 220 determines that the network traffic is management traffic, then dual use device 220 may provide (e.g., may forward) the management traffic to customer network device 205 via a management connection. The management connection may include, for example, a serial connection (e.g., an RS-232 interface). The serial connection may be outside of the network tunnel. In some implementations, dual use device 220 may communicate with customer network device 205 over the management connection via a reverse telnet session, a reverse SSH session, or the like.

In some implementations, management device 225 may communicate with customer network device 205 over the backup path by sending management traffic, via a telnet session, that identifies a management port of dual use device 220. In this case, the management port may include, for example, a transmission control protocol (TCP) port or a user datagram protocol (UDP) port via which dual use device 220 provides the management traffic to customer network device 205. Additionally, or alternatively, management device 225 may communicate with customer network device 205 over the backup path by sending management traffic, via an SSH session, that identifies a management port of dual use device 220. In this case, the management port may include, for example, a serial port via which dual use device 220 provides the management traffic to customer network device 205.

In this way, gateway device 240 and dual use device 220 may assist in providing out-of-band management services and backup data transfer services when a primary path between customer network device 205 and private network 250 fails.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
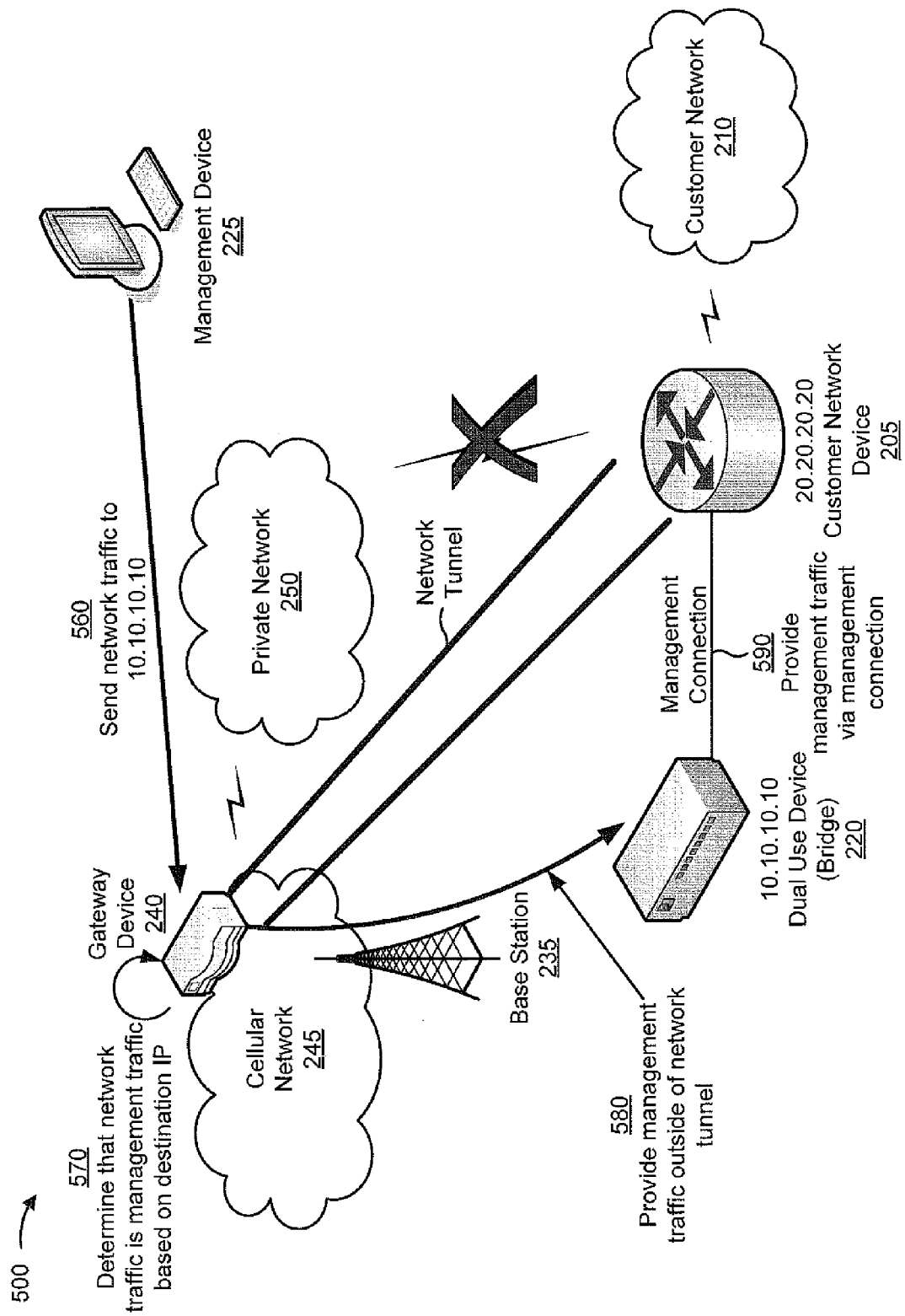

FIGS. 5A and 5B are diagrams of an example implementation 500 relating to example process 400 shown in FIG. 4. FIGS. 5A and 5B show an example of managing incoming out-of-band management traffic and data traffic over a backup path via a dual use device.

For the purpose of FIGS. 5A and 5B, assume that dual use device 220 is a bridge, and is identified by an IP address of 10.10.10.10. Further, assume that customer network device 205 is a router, and is identified by an IP address of 20.20.20.20.

As shown in FIG. 5A, and by reference number 510, assume that there is a failure in a primary path that connects customer network device 205 and private network 250. As shown by reference number 520, assume that user device 230 sends network traffic, destined for customer network device 205 with an IP address of 20.20.20.20, over private network 250. Because the primary path has failed, the network traffic is provided via a backup path to gateway device 240. As shown by reference number 530, gateway device 240 determines that the network traffic is data traffic because the network traffic includes an IP address that identifies customer network device 205.

As shown by reference number 540, based on determining that the network traffic is data traffic, gateway device 240 encapsulates the network traffic (e.g., using a tunnel endpoint identifier), and provides the network traffic to customer network device 205 via a network tunnel that traverses base station 235 and dual use device 220. Dual use device 220 receives the network traffic (e.g., via the network tunnel), and determines that the network traffic is data traffic destined for customer network device 205 (e.g., identified by a tunnel endpoint identifier, such as an IP address of 20.20.20.20). As shown by reference number 550, based on determining that the network traffic is data traffic, dual use device 220 provides the data traffic to customer device 205 via a data connection (e.g., an Ethernet connection included as part of the network tunnel, an IP Passthrough connection, a connection that utilizes dynamic host configuration protocol (DHCP), etc.). Customer network device 205 decapsulates the network traffic, and provides the network traffic to destination device 215 via customer network 210.

As shown in FIG. 5B, assume that there is still a failure in the primary path that connects customer network device 205 and private network 250. As shown by reference number 560, assume that management device 225 sends network traffic, destined for dual use device 220 with an IP address of 10.10.10.10, over private network 250. Because the primary path has failed, the network traffic is provided via a backup path to gateway device 240. As shown by reference number 570, gateway device 240 determines that the network traffic is management traffic because the network traffic includes an IP address that identifies dual use device 220.

As shown by reference number 580, based on determining that the network traffic is management traffic, gateway device 240 provides the network traffic to dual use device 220 via a path that is outside of the network tunnel (e.g., but still traverses base station 235). Dual use device 220 receives the network traffic (e.g., via the path that is outside of the network tunnel), and determines that the network traffic is management traffic to be used to manage customer network device 205 (e.g., based on determining that the IP address of dual use device 220 is identified as a destination IP address in the network traffic). As shown by reference number 590, based on determining that the network traffic is management traffic, dual use device 220 provides the management traffic to customer device 205 via a management connection (e.g., a serial connection that is outside of the network tunnel). Customer network device 205 is configured based on the management traffic.

As indicated above, FIGS. 5A and 5B are provided merely as an example. Other examples are possible and may differ from what was described with regard to FIGS. 5A and 5B.

Figure 6B:
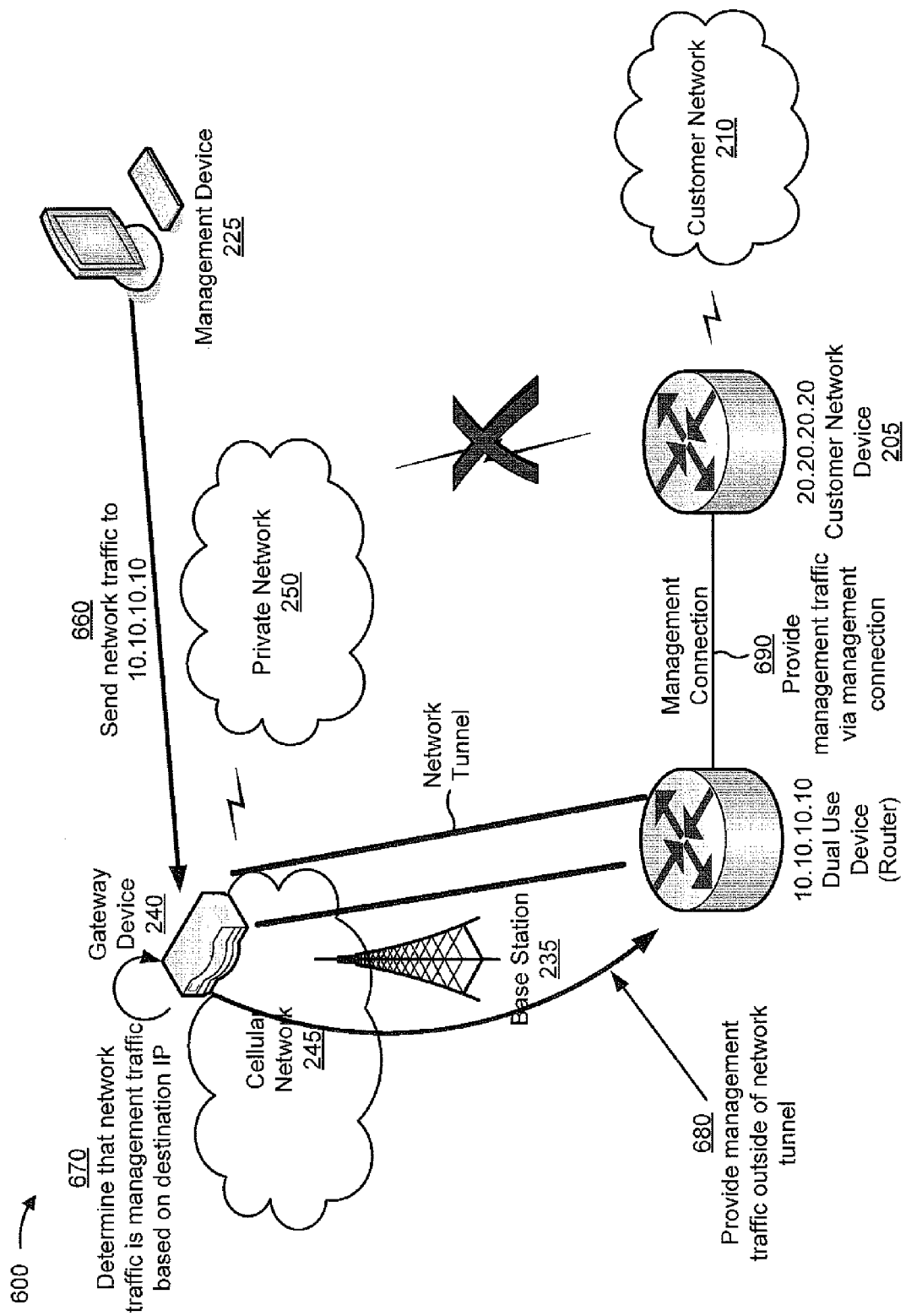

FIGS. 6A and 6B are diagrams of another example implementation 600 relating to example process 400 shown in FIG. 4. FIGS. 6A and 6B show another example of managing incoming out-of-band management traffic and data traffic over a backup path via a dual use device.

For the purpose of FIGS. 6A and 6B, assume that dual use device 220 is a router, and is identified by an IP address of 10.10.10.10. Further, assume that customer network device 205 is a router, and is identified by an IP address of 20.20.20.20.

As shown in FIG. 6A, and by reference number 610, assume that there is a failure in a primary path that connects customer network device 205 and private network 250. As shown by reference number 620, assume that user device 230 sends network traffic, destined for customer network device 205 with an IP address of 20.20.20.20, over private network 250. Because the primary path has failed, the network traffic is provided via a backup path to gateway device 240. As shown by reference number 630, gateway device 240 determines that the network traffic is data traffic because the network traffic includes an IP address that identifies customer network device 205.

As shown by reference number 640, based on determining that the network traffic is data traffic, gateway device 240 encapsulates the network traffic (e.g., using a tunnel endpoint identifier), and provides the network traffic via a network tunnel. In example implementation 600, however, assume that dual use device 220 is a tunnel endpoint (e.g., as opposed to customer network device 205, as shown in example implementation 500).

Dual use device 220 receives the network traffic (e.g., via the network tunnel), decapsulates the network traffic, and determines that the network traffic is data traffic destined for customer network device 205 (e.g., the network traffic identifies a destination IP address of 20.20.20.20). As shown by reference number 650, based on determining that the network traffic is data traffic, dual use device 220 provides the data traffic to customer device 205 via a data connection (e.g., an Ethernet connection). Customer network device 205 provides the network traffic to destination device 215 via customer network 210.

As shown in FIG. 6B, assume that there is still a failure in the primary path that connects customer network device 205 and private network 250. As shown by reference number 660, assume that management device 225 sends network traffic, destined for dual use device 220 with an IP address of 10.10.10.10, over private network 250. Because the primary path has failed, the network traffic is provided via a backup path to gateway device 240. As shown by reference number 670, gateway device 240 determines that the network traffic is management traffic because the network traffic includes an IP address that identifies dual use device 220.

As shown by reference number 680, based on determining that the network traffic is management traffic, gateway device 240 provides the network traffic to dual use device 220 via a path that is outside of the network tunnel. Dual use device 220 receives the network traffic (e.g., via the path that is outside of the network tunnel), and determines that the network traffic is management traffic to be used to manage customer network device 205 (e.g., based on determining that the IP address of dual use device 220 is identified as a destination IP address in the network traffic). As shown by reference number 690, based on determining that the network traffic is management traffic, dual use device 220 provides the management traffic to customer device 205 via a management connection (e.g., a serial connection). Customer network device 205 is configured based on the management traffic.

In this way, gateway device 240 and dual use device 220 may assist in providing out-of-band management services and backup data transfer services when a primary path between customer network device 205 and private network 250 fails.

As indicated above, FIGS. 6A and 6B are provided merely as an example. Other examples are possible and may differ from what was described with regard to FIGS. 6A and 6B.

Figure 7:
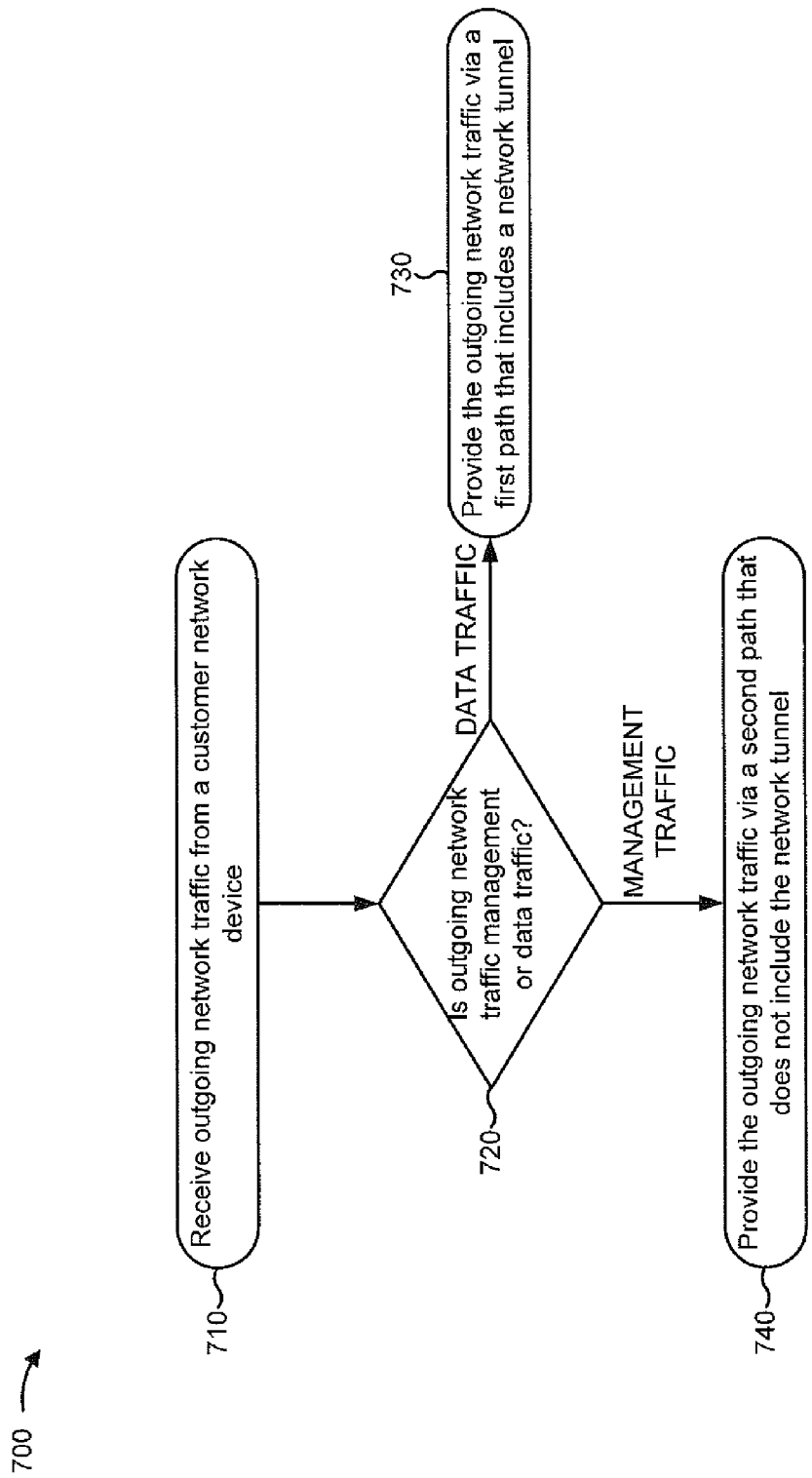
FIG. 7 is a flow chart of an example process for managing outgoing out-of-band management traffic and data traffic over a backup path via a dual use device.

FIG. 7 is a flow chart of an example process 700 for managing outgoing out-of-band management traffic and data traffic over a backup path via a dual use device. In some implementations, one or more process blocks of FIG. 7 may be performed by dual use device 220. In some implementations, one or more process blocks of FIG. 7 may be performed by another device or a group of devices separate from or including dual use device, such as customer network device 205, customer device 215, management device 225, user device 230, base station 235, and/or gateway device 240.

As shown in FIG. 7, process 700 may include receiving outgoing network traffic from a customer network device (block 710). For example, dual use device 220 may receive outgoing network traffic. The outgoing network traffic may be received from customer network device 205 and may be destined for management device 225 and/or user device 230. In some implementations, dual use device 220 may receive the outgoing network traffic due to a failure in a primary path between private network 250 and customer network device 205. The outgoing network traffic may be traffic that is outgoing from a customer premises, in some implementations.

As further shown in FIG. 7, process 700 may include determining whether the outgoing network traffic is management traffic or data traffic (block 720). For example, dual use device 220 may determine whether outgoing network traffic is management traffic or data traffic based on a destination network address associated with the outgoing network traffic, a source network address associated with the outgoing traffic, and/or a traffic type identifier included in the outgoing network traffic, as described above in connection with FIG. 4.

Additionally, or alternatively, dual use device 220 may determine whether outgoing network traffic is management traffic or data traffic based on a connection via which the network traffic is received by dual use device 220. For example, if dual use device 220 receives the outgoing network traffic from customer network device 205 via a data connection (e.g., on a data port, such as an Ethernet port), then dual use device 220 may determine that the network traffic is data traffic. As another example, if dual use device 220 receives the outgoing network traffic from customer network device 205 via a management connection (e.g., on a management port, such as a serial port, a console port, etc.), then dual use device 220 may determine that the network traffic is management traffic.

As further shown in FIG. 7, if the outgoing network traffic is data traffic (block 720—DATA TRAFFIC), then process 700 may include providing the outgoing network traffic via a first path that includes a network tunnel (block 730). For example, if dual use device 220 determines that the outgoing network traffic is data traffic, then dual use device 220 may provide the data traffic to gateway device 240 via a network tunnel. Dual use device 220 may encapsulate the data traffic with a tunnel endpoint identifier (e.g., that identifies a tunnel endpoint device, such as gateway device 240), and may provide the encapsulated data traffic to gateway device 240 via the network tunnel (e.g., via base station 235). Gateway device 240 may decapsulate the data traffic, may determine a destination device for the data traffic (e.g., user device 230), and may provide the data traffic to the destination device.

As further shown in FIG. 7, if the outgoing network traffic is management traffic (block 720—MANAGEMENT TRAFFIC), then process 700 may include providing the outgoing network traffic via a second path that does not include the network tunnel (block 740). For example, if dual use device 220 determines that the outgoing network traffic is management traffic, then dual use device 220 may provide the management traffic to gateway device 240 via a path that does not include the network tunnel. Gateway device 240 may determine a destination device for the management traffic (e.g., management device 225), and may provide the data traffic to the destination device.

In this way, gateway device 240 and dual use device 220 may assist in providing out-of-band management services and backup data transfer services when a primary path between customer network device 205 and private network 250 fails.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8B:
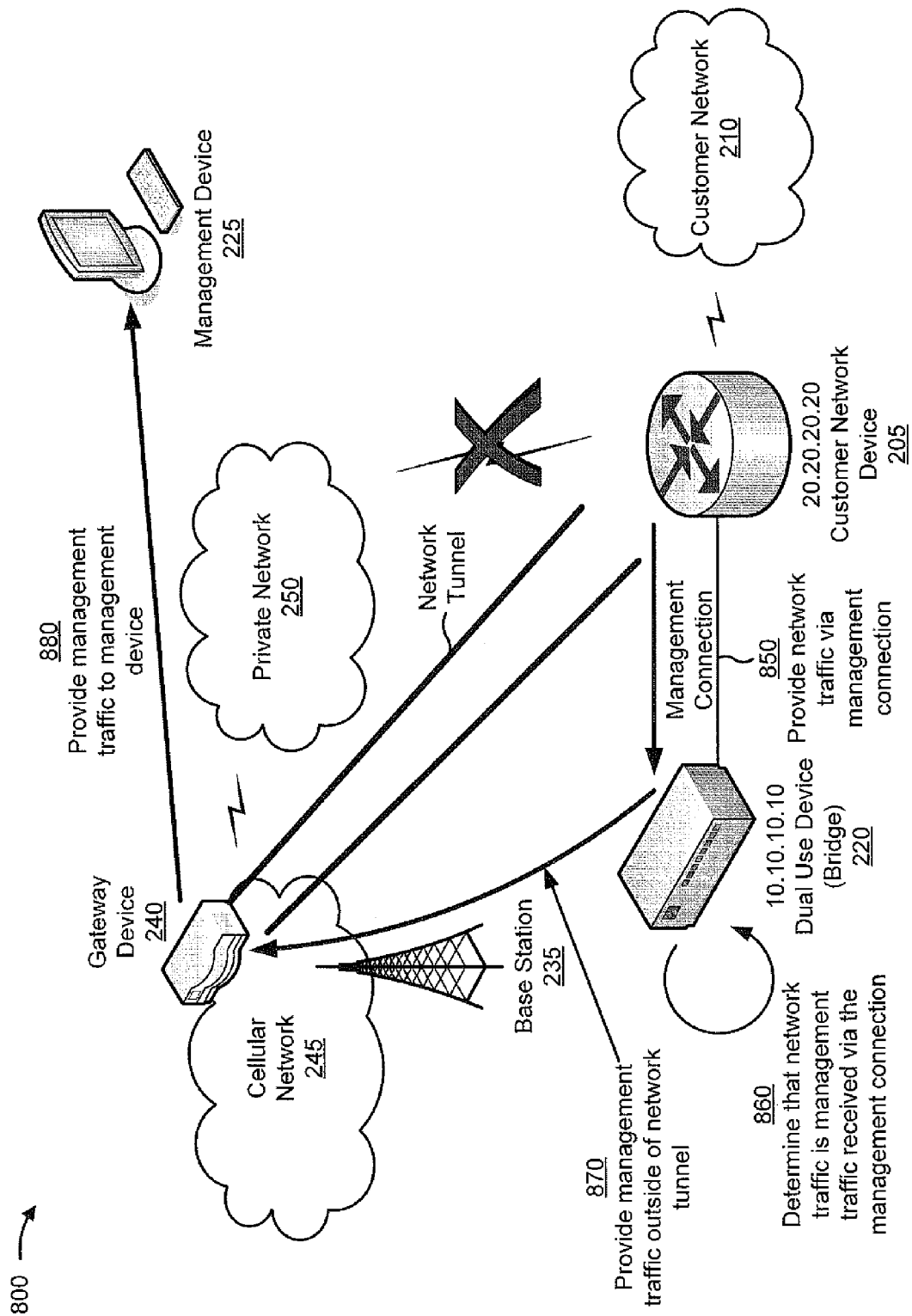

FIGS. 8A and 8B are diagrams of an example implementation 800 relating to example process 700 shown in FIG. 7. FIGS. 8A and 8B show an example of managing outgoing out-of-band management traffic and data traffic over a backup path via a dual use device. For the purpose of FIGS. 8A and 8B, assume that dual use device 220 is a bridge.

As shown in FIG. 8A, assume that there is a failure in a primary path that connects customer network device 205 and private network 250. As shown by reference number 810, assume that customer network device 205 provides network traffic to dual use device 220 via a data connection (e.g., an Ethernet port). Customer network device 205, which is a tunnel endpoint, encapsulates the network traffic before providing the network traffic via the data connection, which is part of a network tunnel. As shown by reference number 820, based on receiving the encapsulated network traffic via the data connection, dual use device 220 determines that the encapsulated network traffic is data traffic. As shown by reference number 830, dual use device 220 provides the data traffic to gateway device 240 via the network tunnel. As shown by reference number 840, gateway device 240 decapsulates the data traffic, identifies user device 230 as a destination for the data traffic, and provides the data traffic to user device 230.

As shown in FIG. 8B, assume that there is still a failure in the primary path that connects customer network device 205 and private network 250. As shown by reference number 850, assume that customer network device 205 provides network traffic to dual use device 220 via a management connection (e.g., a serial port). As shown by reference number 860, based on receiving the network traffic via the management connection, dual use device 220 determines that the network traffic is management traffic. As shown by reference number 870, dual use device 220 provides the management traffic to gateway device 240 via a path that is outside of the network tunnel. As shown by reference number 880, gateway device 240 receives the management traffic, identifies management device 225 as a destination for the management traffic, and provides the management traffic to management device 225.

As indicated above, FIGS. 8A and 8B are provided merely as an example. Other examples are possible and may differ from what was described with regard to FIGS. 8A and 8B.

Figure 9A:
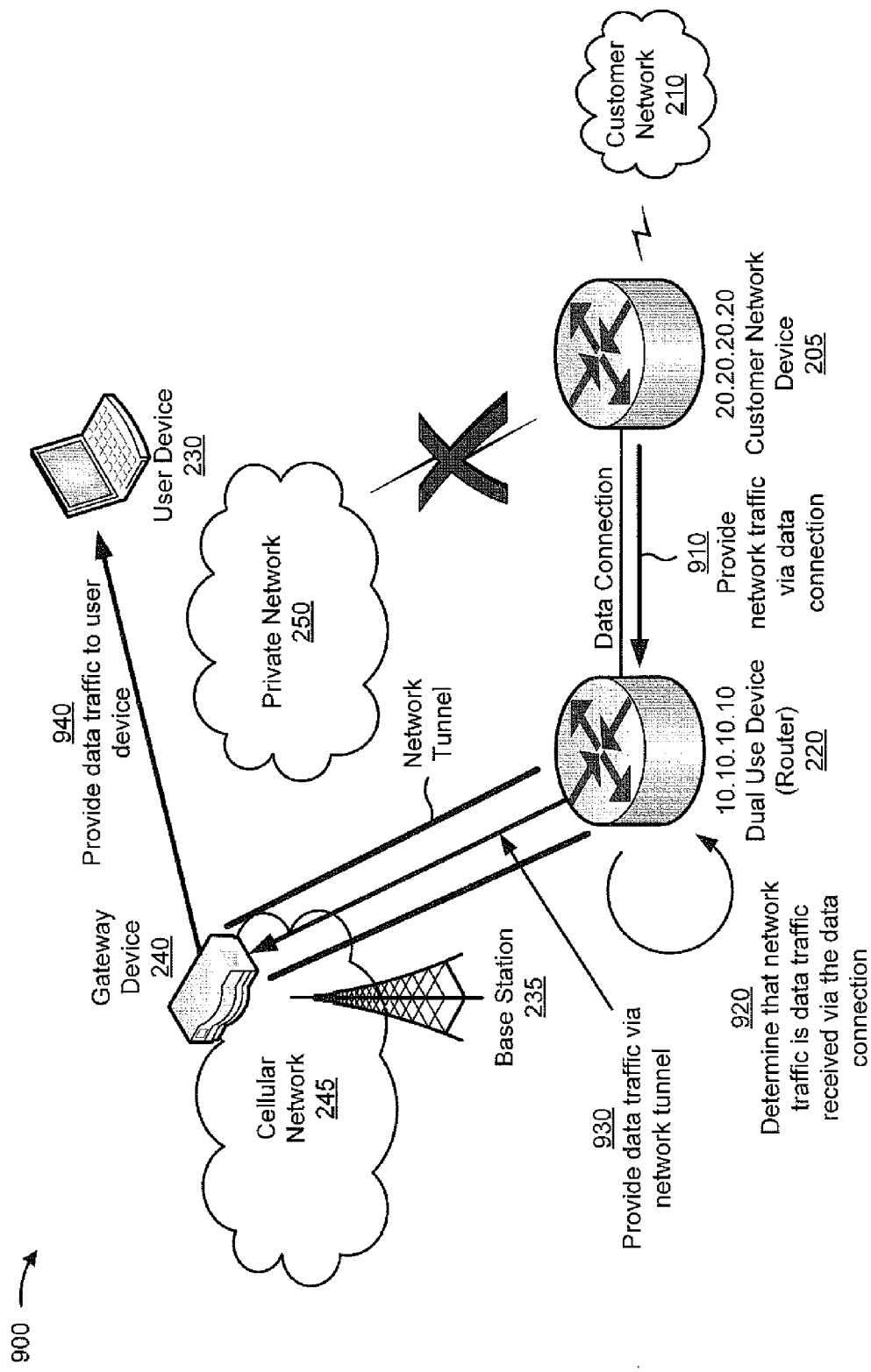
FIGS. 9A and 9B are diagrams of another example implementation relating to the example process shown in FIG. 7.
Figure 9B:
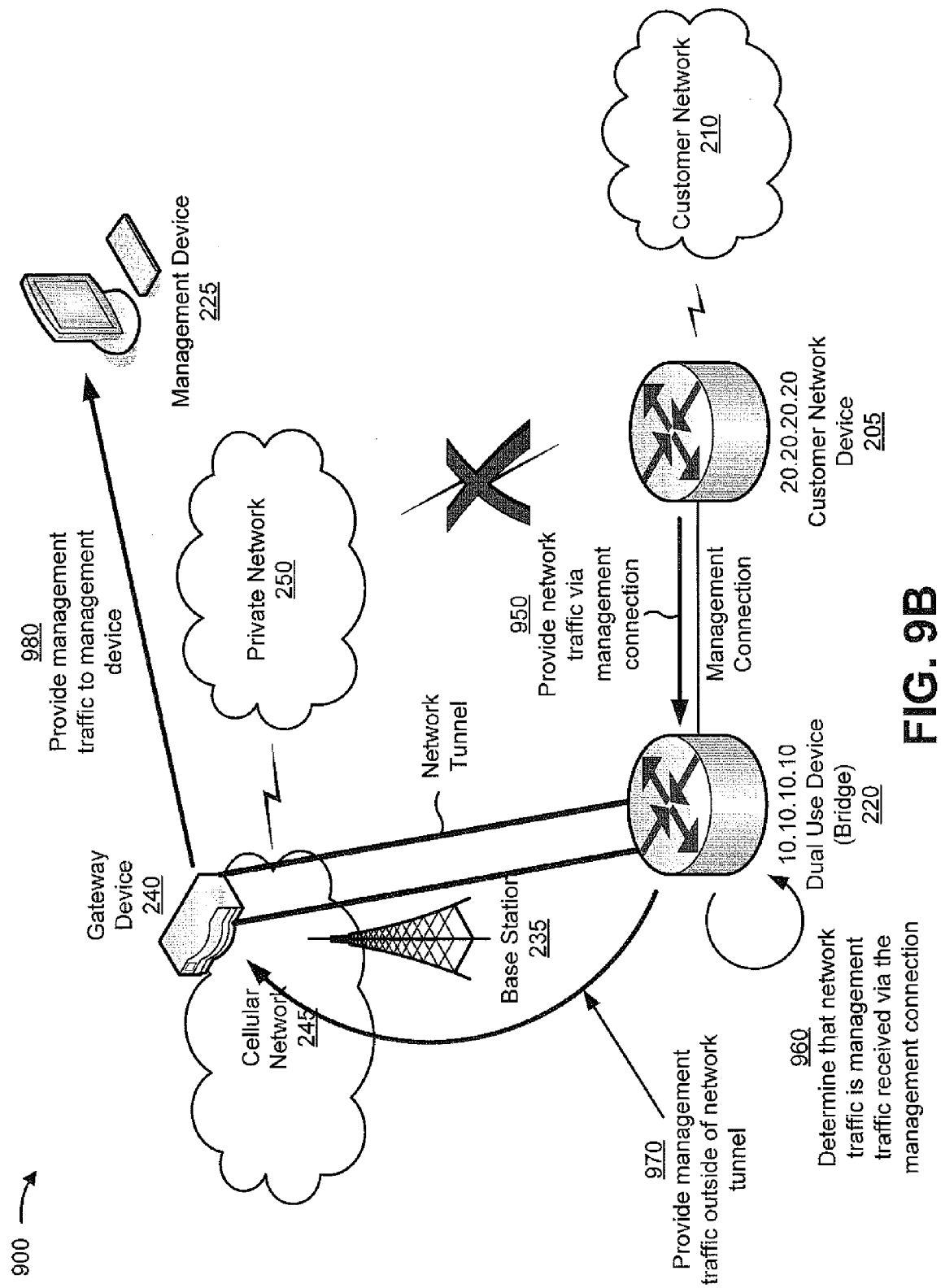

FIGS. 9A and 9B are diagrams of another example implementation 900 relating to example process 700 shown in FIG. 7. FIGS. 9A and 9B show another example of managing outgoing out-of-band management traffic and data traffic over a backup path via a dual use device. For the purpose of FIGS. 9A and 9B, assume that dual use device 220 is a router.

As shown in FIG. 9A, assume that there is a failure in a primary path that connects customer network device 205 and private network 250. As shown by reference number 910, customer network device 205 provides network traffic to dual use device 220 via a data connection (e.g., an Ethernet port). As shown by reference number 920, based on receiving the network traffic via the data connection, dual use device 220 determines that the network traffic is data traffic. Dual use device 220, which is a tunnel endpoint, encapsulates the data traffic after receiving the data traffic via the data connection. As shown by reference number 930, dual use device 220 provides the encapsulated data traffic to gateway device 240 via the network tunnel. As shown by reference number 940, gateway device 240 decapsulates the data traffic, identifies user device 230 as a destination for the data traffic, and provides the data traffic to user device 230.

As shown in FIG. 9B, assume that there is still a failure in the primary path that connects customer network device 205 and private network 250. As shown by reference number 950, customer network device 205 provides network traffic to dual use device 220 via a management connection (e.g., a serial port). As shown by reference number 960, based on receiving the network traffic via the management connection, dual use device 220 determines that the network traffic is management traffic. As shown by reference number 970, dual use device 220 provides the management traffic to gateway device 240 via a path that is outside of the network tunnel. As shown by reference number 980, gateway device 240 receives the management traffic, identifies management device 225 as a destination for the management traffic, and provides the management traffic to management device 225.

In this way, gateway device 240 and dual use device 220 may assist in providing out-of-band management services and backup data transfer services when a primary path between customer network device 205 and private network 250 fails.

As indicated above, FIGS. 9A and 9B are provided merely as an example. Other examples are possible and may differ from what was described with regard to FIGS. 9A and 9B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive incoming network traffic associated with a backup path to a network device,
         the backup path traversing a cellular network;
      determine whether the incoming network traffic is received via a first path that includes a network tunnel or a second path that does not include the network tunnel
      selectively determine a type of traffic associated with the incoming network traffic,
         the type of traffic being data traffic, including traffic other than traffic for performing out-of-band management of the network device, when the incoming network traffic is received via the first path, and
         the type of traffic being management traffic, including the traffic for performing out-of-band management of the network device, when the incoming network traffic is received via the second path; and
      selectively provide, to the network device and based on the type of traffic, the incoming network traffic via a connection,
         the connection being a management connection when the incoming network traffic is management traffic, and
         the connection being a data connection when the incoming network traffic is data traffic,
            the management connection being different from the data connection.

2. The device of claim 1, where the one or more processors are further to:
   determine a destination network address identified by the incoming network traffic; and
   where the one or more processors, when selectively determining the type of traffic associated with the incoming network traffic, are to:
      determine that the type of traffic is data traffic based on the destination network address being a first destination network address, and
      determine that the type of traffic is management traffic based on the destination network address being a second destination network address.

3. The device of claim 2, where the destination network address is at least one of:
   an internet protocol (IP) address; or
   a media access control (MAC) address.

4. The device of claim 1, where the one or more processors are further to:
   determine a destination network address associated with the incoming network traffic,
      the destination network address identifying at least one of:
         the device, or
         the network device;
   where the one or more processors, when selectively determining the type of traffic associated with the incoming network traffic, are to:
      determine that the type of traffic is data traffic based on the destination network address being a first destination network address, and
      determine that the type of traffic is management traffic based on the destination network address being a second destination network address; and
   where the one or more processors are further to:
      provide, to the network device, the incoming network traffic via the management connection when the second destination network address identifies the device, or
      provide, to the network device, the incoming network traffic to the network device via the data connection when the first destination network address identifies the network device.

5. The device of claim 1, where the one or more processors, when receiving the incoming network traffic, are to:
   receive the incoming network traffic via a base station associated with the cellular network.

6. The device of claim 1, where the one or more processors are further to:
   receive, from the network device, outgoing network traffic associated with the backup path;
   determine whether the outgoing network traffic is management traffic or data traffic; and
   provide, to a base station associated with the cellular network, the outgoing network traffic via the first path or the second path based on determining whether the outgoing network traffic is management traffic or data traffic, the outgoing network traffic being provided to the base station via the first path when the outgoing network traffic is data traffic, the outgoing network traffic being provided to the base station via the second path when the outgoing network traffic is management traffic.

7. The device of claim 1, where the one or more processors are further to:

determine that outgoing network traffic is management traffic when the outgoing network traffic is received from the network device via the management connection; or determine that the outgoing network traffic is data traffic when the outgoing network traffic is received via the data connection.

8. A non-transitory computer-readable medium storing instructions, the instructions comprising:

one or more instructions that, when executed by one or more processors, cause the one or more processors to:

receive incoming network traffic associated with a network device;

determine whether the incoming network traffic is received via a first path that includes a network tunnel or a second path that does not include the network tunnel;

selectively determine a type of traffic associated with the incoming network traffic, the type of traffic being data traffic, including traffic other than traffic for performing out-of-band management of the network device, when the incoming network traffic is received via the first path, and the type of traffic being management traffic, including the traffic for performing out-of-band management of the network device, when the incoming network traffic is received via the second path; and selectively provide, to the network device and based on the type of traffic, the incoming network traffic via a connection, the connection being a management connection when the type of traffic is management traffic, and the connection being a data connection when the type of traffic is data traffic, the management connection being different than the data connection.

9. The non-transitory computer-readable medium of claim 8, where the one or more instructions, when executed by the one or more processors, further cause the one or more processors to:

determine a destination network address included in the incoming network traffic; and where the one or more instructions, when selectively determining the type of traffic associated with the incoming network traffic, cause the one or more processors to:

determine that the type of traffic is data traffic based on the destination network address being a first destination network address, and determine that the type of traffic is management traffic based on the destination network address being a second destination network address.

10. The non-transitory computer-readable medium of claim 8, where the one or more instructions, when executed by the one or more processors, further cause the one or more processors to:

determine a traffic type identifier included in the incoming network traffic, the traffic type identifier identifying the incoming network traffic as management traffic or data traffic; and where the one or more instructions, when selectively determining the type of traffic associated with the incoming traffic, cause the one or more processors to:

determine that the type of traffic is data traffic based on the traffic type identifier being a first traffic type identifier, and determine that the type of traffic is management traffic based on the traffic type identifier being a second traffic type identifier.

11. The non-transitory computer-readable medium of claim 8, where the management connection is a serial connection.

12. The non-transitory computer-readable medium of claim 8, where the data connection is an Ethernet connection.

13. The non-transitory computer-readable medium of claim 8, where the management connection provides access to a console port of the network device.

14. The non-transitory computer-readable medium of claim 8, where the second path includes at least one of:

a telnet session; or a secure shell (SSH) session.

15. A method, comprising:

receiving, by a device and from a base station, incoming network traffic associated with a backup path between a network device and an external network;

determining, by the device, whether the incoming network traffic is received via a first path that includes a network tunnel or a second path that does not include the network tunnel;

selectively determining, by the device, a type of traffic associated with the incoming network traffic, the type of traffic being data traffic, including traffic other than traffic for performing out-of-band management of the network device, when the incoming network traffic is received via the first path, and the type of traffic being management traffic, including the traffic for performing out-of-band management of the network device, when the incoming network traffic is received via the second path; and selectively providing, by the device, to the network device, and based on the type of traffic, the incoming network traffic via a connection, the connection being a management connection when the type of traffic is management traffic, and the connection being a data connection when the type of traffic is data traffic, the management connection being different than the data connection.

16. The method of claim 15, further comprising:

receiving, from the network device, an outgoing network traffic associated with the backup path;

identifying the outgoing network traffic as management traffic or data traffic; and providing, to the base station, the outgoing network traffic via the first path or the second path based on identifying the outgoing network traffic as management traffic, the outgoing network traffic being provided to the base station via the first path, when the outgoing network traffic is identified as data traffic, and the outgoing network traffic being provided to the base station via the second path when the outgoing network traffic is identified as management traffic.

17. The method of claim 15, further comprising:
identifying an outgoing network traffic as management traffic when the outgoing network traffic is received from the network device via the management connection; or
identifying the outgoing network traffic as data traffic when the outgoing network traffic is received from the network device via the data connection.

18. The method of claim 15, further comprising:
determining a destination network address associated with the incoming network traffic; and
where selectively determining the type of traffic associated with the incoming network traffic comprises:
  determining that the type of traffic is data traffic based on the destination network address being a first destination network address, and
  determining that the type of traffic is management traffic based on the destination network address being a second destination network address.

19. The method of claim 15, further comprising:
determining a source network address associated with the incoming network traffic; and
where selectively determining the type of traffic associated with the incoming network traffic comprises:
  determining that the type of traffic is data traffic based on the source network address being a first source network address, and
  determining that the type of traffic is management traffic based on the source network address being a second source network address.

20. The method of claim 15, further comprising:
determining that a primary path has failed.

* * * * *